United States Patent
Blaker et al.

[11] 3,760,050
[45] Sept. 18, 1973

[54] PROCESS FOR THE PREPARATION OF SUBSTANTIALLY ANHYDROUS MAGNESIUM CHLORIDE FROM MAGNESIUM CHLORIDE HYDRATES

[75] Inventors: Ivar Blaker, Nystrand; Oystein Boyum, Skien; Knut Anton Andreassen; Reidar Skipperud Lunde, both of Porsgrunn; Kjell Wallin Tveten, Bole, all of Norway

[73] Assignee: Norsk Hydro a.s., Oslo, Norway

[22] Filed: Oct. 28, 1970

[21] Appl. No.: 84,652

[30] Foreign Application Priority Data
Oct. 29, 1969 Norway............................. 4294/69

[52] U.S. Cl................................. 264/82, 264/117
[51] Int. Cl............................................. B01j 2/14
[58] Field of Search ................... 264/117, 82; 34/10

[56] References Cited
UNITED STATES PATENTS
3,035,301  5/1962  Rodis et al........................ 264/117
2,436,766  2/1948  Davis................................. 264/117
3,127,249  3/1964  Cuthbert et al..................... 264/13

*Primary Examiner*—Robert F. White
*Assistant Examiner*—J. R. Hall
*Attorney*—Wenderoth, Lind & Ponack

[57] ABSTRACT

This invention relates to a process for preparing magnesium chloride pellets suitable for fusion electrolysis to produce magnesium metal. Solid particles of magnesium chloride hydrate, such as the dihydrate, are agglomerated with molten magnesium chloride hydrate, such as the tetrahydrate, to form a raw pellet product having a moderate moisture content, such as about 2.8 moles of $H_2O$ per mole of $MgCl_2$. The raw pellets are further dehydrated in a shaft kiln to the extent desired. It is possible to prepare a raw-pellet product that can be dehydrated to substantially anhydrous magnesium chloride in a one-stage dehydration operation. The solid particles of magnesium chloride hydrate advantageously are prills, suitably of a size between 0.2 and 1.0 mm.

9 Claims, 1 Drawing Figure

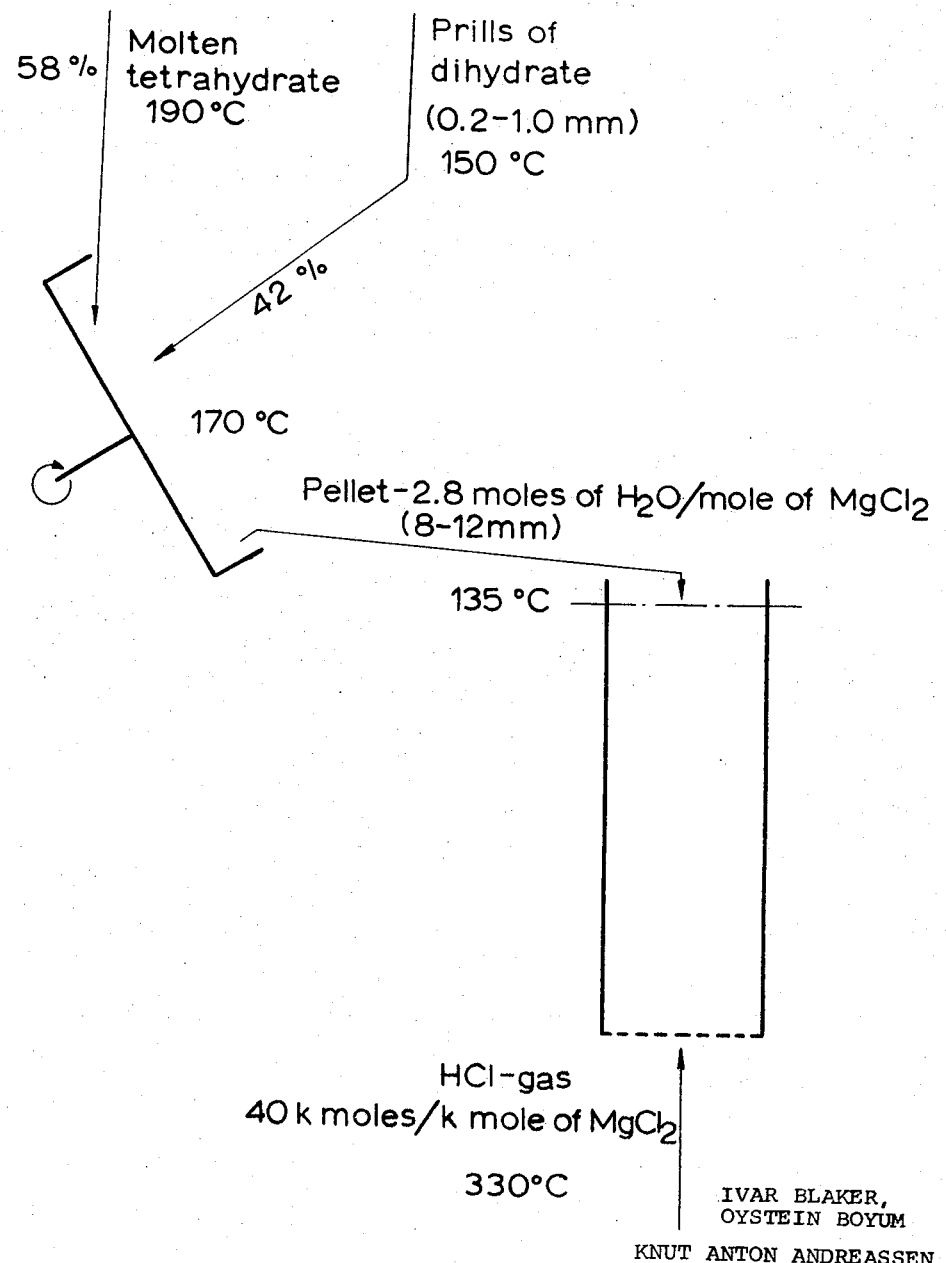

PROCESS FOR THE PREPARATION OF SUBSTANTIALLY ANHYDROUS MAGNESIUM CHLORIDE FROM MAGNESIUM CHLORIDE HYDRATES

The invention relates to a process for preparing magnesium chloride pellets suitable for the electrolytic production of magnesium from a melt. More particularly the invention relates to a process for preparing magnesium chloride pellets or agglomerates suitable to be charged to electrolytic cells for the production of magnesium metal. In their most dehydrated form the agglomerates consist of substantially anhydrous magnesium chloride.

The term agglomeration as used herein pertains to processes such as drum granulation or rotating disk pelletization, which involve a balling together of a solid and a molten i.e. heated liquid phase, while simultaneously tumbling the granules.

When working up magnesium chloride hydrate to a dehydrated chloride suitable for melt electrolysis a number of processes are known. Recently a great deal of interest seems to have been focused on processes comprising fluidized bed dehydration, either following a spray drying process or in conjunction with a direct injection of magnesium chloride brine into a fluidized bed containing partially dehydrated magnesium chloride hydrate particles. A serious drawback of such processes is a considerable material loss in the form of dust, to a great extent magnesium chloride in the form of so small particles that they cannot be recovered in an economical way.

A process that has been much used, comprises drying crushed magnesium chloride hydrate in a kiln with overlying beds, starting from for instance the hexahydrate and drying until the dehydrate is obtained. Further, it is known to dehydrate flaked magnesium chloride hydrates in a shaft kiln.

With these known processes it is especially the material loss in the form of dust that constitutes a great drawback and results in considerable losses of magnesium chloride.

By means of the process of the invention we have succeeded in preparing agglomerates or pellets of magnesium chloride hydrates which are mechanically strong and resistant to abrasion and which can be dehydrated with a minimum of dust formation, retaining the favourable structure of the pellets so that the dehydration, completed to substantially anhydrous magnesium chloride if so desired, can be effected satisfactorily rapidly by means of shaft kiln drying or in principle similar dehydration processes.

According to the invention pellets are prepared by agglomerating solid particles of magnesium chloride hydrate by means of heated liquid magnesium chloride hydrate. In order to be able to dehydrate such agglomerates in an advantageous manner and with satisfactory result, if desired up to substantially anhydrous magnesium chloride, the agglomerates must be mechanically strong and resistant to abrasion during and after the dehydration treatment, so that dust formation will be minimal and so that the agglomerates will retain their spherical shape. Further, the agglomerates must have a structure favourable to a satisfactorily rapid dehydration.

We have now found that agglomerates which satisfy these requirements and which otherwise lend themselves to be used for the purposes mentioned above can be obtained by agglomerating solid particles of magnesium chloride hydrate by means of liquid magnesium chloride hydrate, alternatively magnesium chloride brine, to form substantially spherical agglomerates which are then dehydrated in a stream of gas in one or more steps.

It is now possible to obtain a magnesium chloride having a very low content of oxygen and hydrogen (usually reported as MgO and $H_2O$) on dehydration in the presence of HCl gas. The dehydrated agglomerates produced according to the invention are well suited for being directly charged to the electrolytic cell.

According to a particularly advantageous agglomerating process said solid particles are agglomerated by means of liquid magnesium chloride hydrate, the moisture content of which corresponds to $MgCl_2 \cdot Y\, H_2O$, wherein Y represents a numerical value between 3.9 and 5.5, to form agglomerates having a moisture content corresponding to $MgCl_2 \cdot Z\, H_2O$, wherein Z represents a numerical value between 2.0 and 3.5, whereupon the agglomerates obtained are dehydrated in a shaft kiln with HCl gas, preferably in a one-stage dehydration. When it is desired to complete the dehydration to substantially anhydrous magnesium chloride, advantageously agglomerates should be prepared having a moisture content corresponding to a numerical value for Z of between 2.5 and 2.9, preferably between 2.6 and 2.8.

Other aspects of the process of the invention will be apparent from the following description and the examples that will be given.

Advantageously, the agglomeration is carried out in an apparatus of the rotating disk type or the granulating drum type. We prefer to use the rotating disk, and for this reason the agglomerates will often be called pellets in the instant description and claims.

When carrying out the process of the invention the degree of hydration of the solid phase as well as of the liquid phase can be varied within wide ranges. Thus, satisfactory pellet formation and dehydratability can be obtained with for instance a. solid phase having 3.9 moles of $H_2O$ per mole of $MgCl_2$ and
liquid phase having 4.0 moles of $H_2O$ per mole of $MgCl_2$ as well as with for instance b. a solid phase having 4.0 moles of $H_2O$ per mole of $MgCl_2$ and
a liquid phase having 11.0 moles of $H_2O$ per mole of $MgCl_2$.

When using relatively strongly hydrated starting materials, normally the pellet product will also be relatively strongly hydrated. The pellet product then can be first dried by means of an inexpensive gas such as air, to a degree of hydration of for instance 2.5 moles of $H_2O$ per mole of $MgCl_2$ and thereafter further dehydrated using HCl gas.

It will be noted that the production of pellets having a degree of hydration of 5.5 – 6 moles of $H_2O$ per mole of $MgCl_2$ or higher is of little or no practical interest. For one thing, the rather extensive dehydration required will weaken the pellet, so that its mechanical strength will be unsatisfactory. Secondly, dehydrating the pellets in a shaft kiln is a more expensive way of removing moisture than evaporating the brine. For these reasons we prefer to select the starting materials for the agglomeration so as to obtain pellets the degree of hydration of which is lower than about 4.5 moles of $H_2O$ per mole of $MgCl_2$. At least up to this moisture content level of the raw pellet product, the pellets can be readily dried in a shaft kiln in one single air drying step, preferably to a degree of hydration corresponding to 2 – 2.5 moles of $H_2O$ per mole of $MgCl_2$, whereupon the dehydration can be completed to substantially anhydrous magnesium chloride using one single HCl dehydration step.

With respect to the degree of hydration of the solid starting material used in the agglomeration we have found that it should not be substantially higher than corresponding to the tetrahydrate. Exceeding this degree of hydration makes it difficult to obtain pellets that are mechanically strong as well as readily dehydratable.

The relative proportions of the solid and the liquid phases to be used in the pelletization process can vary within wide limits as seen from the examples below. Of importance in this connection is the grain size distribution and thus the specific surface area of the solid component. The larger this area, the greater normally the proportion of the liquid component to be used for achieving a satisfactory pellet formation. Further, the pelletization temperature, often called the "rotating disk temperature", will be of some consequence, since a high temperature can result in a considerable removal of moisture from the agglomeration apparatus. The temperature therein is influenced by the temperature and heat content of the materials charged, however, it can also be influenced in other ways, for instance by introducing hot gas such as steam to the agglomeration apparatus.

Thus, there are several possibilities at hand to effect and control the pelletization process so that, in carrying out the process of the invention, the operator will be able to produce a satisfactory raw pellet using starting materials that would be more readily available in each case. However, as a rule, one would not find it advantageous to use a pelletization rotating disk for evaporation purposes since such evaporation, for instance of the magnesium chloride hexahydrate, can be effected in a less expensive way.

In the following a preferred embodiment of the invention will be described wherein a number of important advantages can be obtained simultaneously.

We have discovered that it is possible to pelletize a solid magnesium chloride hydrate of a low degree of hydration together with a liquid magnesium chloride hydrate achieving raw pellet product having a very satisfactory mechanical strength, abrasion resistance and dehydratability, and having in addition a sufficiently low moisture content to enable the complete dehydration to substantially anhydrous magnesium chloride to be effected directly with HCl gas in one single step. Further advantages that can be obtained using this embodiment will be mentioned below.

According to this embodiment of the invention solid particles of magnesium chloride hydrate, the moisture content of which is not higher than 3.5 moles of $H_2O$ per mole of $MgCl_2$, are agglomerated by means of liquid magnesium chloride hydrate, the moisture content of which corresponds to $MgCl_2 \cdot Y\ H_2O$, wherein Y represents a numerical value between 3.9 and 5.5, the agglomerates obtained having a moisture content corresponding to $MgCl_2 \cdot Z\ H_2O$, wherein Z represents a numerical value between 2.2 and 3.5, whereupon the agglomerates are dehydrated in a shaft kiln in one single step using HCl gas.

According to the most preferred embodiment of the invention Z represents a numerical value between 2.5 and 2.9, preferably between 2.6 and 2.8. The agglomerates then can be readily dehydrated in a shaft kiln in one single step using HCl gas, resulting in a substantially anhydrous magnesium chloride product having a very low content of hydrate and oxide. We have found that by means of this preferred embodiment of the invention it is regularly possible to obtain pellets of magnesium chloride containing less than 0.5% by weight of $H_2O$ and less than 0.2% by weight of MgO.

In order to produce pellets having a degree of hydration corresponding to 2.5 – 2.9 moles of $H_2O$ per mole of $MgCl_2$, we prefer to start from a solid component having a degree of hydration substantially equal to that of the dihydrate and pelletize by means of a liquid magnesium chloride hydrate having a degree of hydration substantially equal to that of the tetrahydrate. Magnesium chloride hydrates having about 4 moles of $H_2O$ per mole of $MgCl_2$ boil at temperatures only about 10°C above the melting temperature. The latter for the tetrahydrate is about 182°C. The agglomeration results in a pellet product which is very satisfactory in all respects. It has turned out to be possible to achieve this without introducing to the rotating disk any extra heat in the form of steam or hot gas.

As the solid component we prefer to use prills. We have found that the use of prills provides pellets having an exceptionally advantageous structure for the further dehydration to anhydrous or low-moisture magnesium chloride. We prefer to use a prilled product having particle sizes between 0.2 and 1.00 mm. A small proportion of sub-sized prills, such as a few percent thereof, will facilitate pellet formation, while too much of the sub-sized prills will cause the pellet to be too dense and impervious. Advantageously there can be employed prills prepared as described in U. S. patent application Ser. No. 84537, filed Oct. 27, 1970, which corresponds to Norwegian Patent Application 4293/69, filed Oct. 29, 1969.

The following example will serve to illustrate a preferred embodiment of the invention, referring now to the flow sheet of the drawing.

Prills of magnesium chloride dihydrate, largely of a size within the range 0.2–1.0 mm, were pelletized by means of liquid magnesium chloride tetrahydrate on a rotating disk having a diameter of 60 cm and a disk edge height of 15 cm and sloping 55°. The prills used were prepared from tetrahydrate by spraying in a tower and dehydrating in a fluidized bed to a moisture content corresponding to 2 moles of $H_2O$ per mole of $MgCl_2$. The temperature of the prills when fed to the rotating disk was about 150°C.

Tetrahydrate heated liquid was fed to the rotating disk at a temperature of about 190°C.

Both prills and heated liquid were fed to the disk continuously, the prills constituting 42 percent by weight and the liquid component constituting 58 percent by weight of the feed to the rotating disk, which totaled 200 kg/hour.

By heat insulating the disk one could obtain a temperature of the pellets leaving the disk of 160°C without external introduction of heat to the disk. The pellets thus prepared hardened rapidly so that they retained their spherical shape. In the course of half a minute they were hard and firm. Having a temperature of 135°–140°C the pellet product was transferred to the top of a shaft kiln, the height of which was about 6 m, to be dehydrated to anhydrous magnesium chloride. Substantially anhydrous HCl gas (about 0.5% $H_2O$) was fed to the bottom of the kiln countercurrently with the pellets which were made to sink slowly through the kiln. The inlet temperature of the HCl gas was 330°C and the flow rate 37.5 kmoles of HCl/kmole of $MgCl_2$. The dehydration time was 10 hours.

Result

The dehydrated pellet product consisted of mechanically strong, free-flowing substantially spherical pellets, largely of a size between 8 and 12 mm. Analysis showed an average oxide content of less than 0.2% by weight MgO and less than 0.4% by weight $H_2O$.

The total material loss in the form of dust in the pelletization step and the dehydration step was less than 1 percent by weight.

As will be seen from the example above, the prills of the dihydrate were fed to the pelletization disk at a temperature of 150°C. Pelletizing such relatively strongly dehydrated magnesium chloride hydrate we have found that a high prill temperature, preferably 150°–160°C, is rather essential if not necessary to achieve the most preferred pellet structure, that is a pellet wherein the prills are closely packed, bonded together by a minimal amount of solidified liquid phase. Such a pellet is very readily dehydratable and the pellet resulting on completed dehydration is mechanically strong and resistant to abrasion.

Attempting to pelletize according to the process of the example above, deviating therefrom only by using prills of a lower temperature, one will find that it is necessary to use a relatively greater amount of the liquid component, and pellets will result wherein prills are less closely packed and held together by a relatively thick layer of solidified liquid phase between the prills. This pellet product is satisfactory, although not so readily dehydratable as the above-mentioned preferred pellet, the latter also having a superior mechanical strength.

In accordance with the above, the pellet that is most satisfactory in respect of dehydratability, mechanical strength and resistance to abrasion is obtained when the proportion of the melt phase in the pellet product is small. This is exactly what is desirable also with respect to the economy of the dehydration step since the amount of moisture to be eliminated during the shaft dehydration process will be at a minimum.

In practice it is difficult to use a liquid component of a lower degree of hydration than about 4 moles of $H_2O$ per mole of $MgCl_2$, since a further evaporation will cause precipitation of solid matter. As regards the solid component (the prills), there will be no definite lower limit as to its degree of hydration since it is possible to use a strongly dehydrated magnesium chloride, for instance spray dried magnesium chloride, as solid component in the agglomeration process. However, the resulting pellets will be more compact and not so readily dehydratable as the preferred pellets mentioned above, the structure of which is characterized by closely packed prills. Using spray dried magnesium chloride as solid component in the agglomeration process it is possible however to obtain a pellet product having a particularly low moisture content without causing the oxide content to be prohibitively high. Since the spray drying technique provides a relatively inexpensive dehydration, agglomerating a spray dried magnesium chloride with a molten component containing for instance 4–6 moles of $H_2O$ per mole of $MgCl_2$ may constitute an economically favourable alternative. On account of the excellent pellet quality obtained when pelletizing dihydrate prills with tetrahydrate melt, as described above, such embodiment of the invention is the preferred one.

A number of experiments relating to the preparation of pellets and the dehydration thereof are presented below. Table 1 shows data relating to the pelletization of solid magnesium chloride hydrate with molten magnesium chloride hydrates of varying moisture content. In the tests numbered 1–6, prills of tetra hydrate (or the like) of varying sizes have been used, and in the tests numbered 8–11 prills were used which had been fluidized bed dehydrated to a moisture content of from 2.0–2.5 moles of $H_2O$ per mole of $MgCl_2$. In test No. 7 the solid component is spray dried magnesium chloride having a moisture content corresponding to 1.4 moles of $H_2O$ per mole of $MgCl_2$. In the tests 7–11 the pellet product has a considerably lower moisture content than in the tests no. 1–6.

Table 2 shows data relating to shaft kiln dehydration of the pellet product prepared according to Table 1. In the tests numbered 1–6 the pellet product was first dehydrated with air to obtain the dihydrate and thereafter dehydrated with HCl gas to provide substantially anhydrous magnesium chloride. In the tests numbered 7–11 the air drying step was omitted, and these tests thus are examples of the preferred embodiment of the invention.

TABLE 1.—PELLETIZATION ON A 60 CM. DIAMETER ROTATING DISK

| Test No. | Solid phase (prills) | | Brine (melt) | | Rotating disk temp., °C. | Pellet | |
|---|---|---|---|---|---|---|---|
| | Size, mm. | Moles $H_2O$ per mole $MgCl_2$ | Percent by wt. of feed | Moles $H_2O$ per mole $MgCl_2$ | Percent by wt. of feed | | Moles $H_2O$ per mole $MgCl_2$ | Percent MgO |
| 1 | <1.5 | 3.9 | 72 | 11 | 28 | ca. 60 | 5.2 | 0.15 |
| 2 | <1.5 | 4.0 | 50 | 11 | 50 | [1] ca. 140 | [1] 4.3 | 0.30 |
| 3 | 0.2–1.0 | 4.3 | 75 | 11 | 25 | [2] 120–130 | [2] 4.1 | 0.16 |
| 4 | <1.5 | 4.1 | 67 | 6.0 | 33 | [2] 118–125 | 4.3 | 0.14 |
| 5 | <1.5 | 3.9 | 70 | 6.0 | 30 | [2] 130–135 | 3.9 | 0.16 |
| 6 | Crushed | 4.0 | 25 | 3.9 | 75 | 125–128 | 3.9 | 0.18 |
| 7 | <0.2 | 1.4 | 60 | 4.0 | 40 | 176 | 2.3 | 2 |
| 8 | 0.2–1.0 | 2.0 | 53 | 4.0 | 47 | 168–173 | 2.8 | 0.50 |
| 9 | 0.2–1.0 | 2.0 | 57 | 3.9 | 43 | 170–175 | 2.7 | 0.70 |
| 10 | 0.2–1.0 | 2.1 | 58 | 4.1 | 42 | 170–172 | 2.9 | 0.60 |
| 11 | 0.2–1.0 | 2.5 | 50 | 3.9 | 50 | 170–173 | 3.2 | 0.35 |

[1] Heat introduced on rotating disk causing dehydration.
[2] A little heat introduced causing some dehydration.

NOTE.—In all tests the disk rotating speed was between 16 and 25 r.p.m. the disk sloping 45 to 55°.

TABLE 2.—SHAFT KILN DEHYDRATION OF PELLETS OBTAINED ACCORDING TO TABLE 1

| Test No. | Raw pellets, mm. | Dehydration with air | | | | | | Dehydration with HCl gas | | | | Percent | | Mechanical strength [1] |
| --- | --- | --- | --- | --- | --- | --- | --- | --- | --- | --- | --- | --- | --- | --- |
| | | Kgms. of air per kmole $MgCl_2$ | Treatment time, min. | Pellet temp., °C. | | Percent after dehydration | | Kmole gas/ kmole $MgCl_2$ | Treatment time, min. | Pellet temp., °C. | | After dehydration | | |
| | | | | Top | Bottom | MgO | $H_2O/MgCl_2$ | | | Top | Bottom | MgO | $H_2O$ | |
| | 6–8 | 5,500 | 900 | 100 | 137 | 1.3 | 2.0 | 35.0 | 900 | 135 | 320 | 0.15 | 0.6 | 80 |
| | 6–8 | 5,000 | 1,200 | 105 | 140 | 1.6 | 2.1 | 35.0 | 960 | 135 | 320 | 0.22 | 0.4 | 85 |
| 3 | 8–12 | 5,000 | 1,200 | 100 | 140 | 1.0 | 2.2 | 35.0 | 960 | 135 | 320 | 0.19 | 0.3 | 85 |
| 4 | 6–8 | 5,000 | 800 | 105 | 140 | 1.4 | 2.0 | 35 | 900 | 135 | 320 | 0.16 | 0.2 | 70 |
| 5 | 6–8 | 5,000 | 750 | 95 | 140 | 0.9 | 2.1 | 35 | 900 | 135 | 320 | 0.17 | 0.3 | 70 |
| 6 | 8–12 | 5,000 | 1,200 | 95 | 140 | 1.8 | 2.1 | 35 | 900 | 135 | 320 | 0.22 | 0.3 | 85 |
| 7 | 8–12 | | | | | | | 37.5 | 650 | 135 | 320 | 0.20 | 0.1 | >90 |
| 8 | 8–12 | | | | | | | 42.5 | 600 | 135 | 310 | 0.15 | 0.4 | >90 |
| 9 | 8–12 | | | | | | | 42.5 | 600 | 135 | 310 | 0.18 | 0.4 | >90 |
| 10 | 8–12 | | | | | | | 45.0 | 600 | 135 | 300 | 0.19 | 0.0 | >90 |
| 11 | 8–12 | | | | | | | 60 | 700 | 132 | 275 | 0.15 | 0.3 | >90 |

[1] The dehydrated pellets were tested in an apparatus in which the pellets, in the course of a certain time interval, were made to fall a certain number of times against a hard floor plate. The degree of pellet disintegration (n) was taken as a measure of their mechanical strength, (100-n) percent, wherein n=percent by weight of fines smaller than 3 mm.

When the last column of Table 2 shows figures some of which are considerably lower than 100 percent, this will be understood in the light of the fact that the test in question has been chosen so as to be a very severe test for the agglomerates. The figures in the last column of the table will be understood to be mutually relative strength figures.

In all of the tests numbered 1–11 the material loss in the form of dust was very slight.

The agglomerates prepared in the tests numbered 7–11 constitute a group of agglomerates which are particularly advantageous in several ways. They had excellent mechanical strength; they were particularly readily dehydratable and they enabled the complete dehydration to substantially anhydrous chloride in one single step, that is a HCl dehydration step.

However, from the tables it will also be apparent that the process of the invention enables the production of satisfactory agglomerates from highly varying starting hydrates and that the raw pellet product can contain at least up to 5.2 moles of $H_2O$ per mole of $MgCl_2$ and yet lend itself to dehydration to provide pellets having a satisfactory mechanical strength.

If extra heat is added to the pelletization disk so that a considerable amount of moisture is expelled (test no. 2–5) the moisture content of the starting magnesium chloride hydrate can be high, compare test no. 2 and 3. However, such introduction of external heat would make the process less simple and more expensive.

With respect to the dehydration time intervals, Table 2 shows that the dehydration with air was somewhat slow in test no. 2, 3 and 6 (1,200 minutes = 20 hours). This dehydration time is of the same order of magnitude as would be required when drying briquettes having approximately the same mechanical strength. This would show that agglomerates prepared according to the invention are at least as satisfactory as agglomerates prepared by means of the briquetting process which is considerably more expensive. Normally the agglomerates obtained according to the invention will be considerably better suited for the purpose of producing anhydrous magnesium chloride.

Normally one will find that the mechanical strength will be impaired if conditions are modified with the aim of improving dehydratability, and vice versa, that is that the dehydrability would be impaired if one attempts to improve the mechanical strength. This statement also applies to briquettes.

In spite of this we have, in the tests no. 7–11, as Table 2 shows, achieved both a very satisfactory dehydratability as well as an excellent mechanical strength.

During shaft kiln drying the pellet product will be gradually dehydrated as it sinks through the kiln, the moisture liberated from the pellets being absorbed by the drying gas. The latter therefore will obtain an increasing moisture content as it passes upward through the shaft kiln, while the temperature of the gas will at the same time decrease. Generally speaking, the possibility will exist that at a certain level in the shaft kiln the gas will be so moist and so much cooled that the drying potential of the gas in contact with the agglomerates has been lost. Under such circumstances the dehydration process of course will not be effective. Expressed in another way: the temperature of the drying gas must not fall below the temperature of equilibrium.

Still another requirement is that the agglomerates must not be heated to melting temperature at any level in the shaft kiln, causing sintering of the pellets which can result in arching or bridging of the material in the kiln and possibly clogging thereof, as well as other disadvantages.

The gradual dehydration of magnesium chloride hydrate is known to occur through a sequence of hydration stages, the hexa-, tetra-, di-, and monohydrate, the melting point rising in the order mentioned. In practice there will normally during the dehydration process be present at least two hydrates in mixture, except in the ultimate phase of the dehydration process, and this fact will be understood to increase the difficulties in observing or satisfying all of the above-mentioned requirements simultaneously. A lower hydrate (for instance the dihydrate) requires a higher temperature to be dehydrated satisfactorily rapidly than does a higher hydrate (for instance the hexahydrate). For any given hydrate there will be a minimum temperature (the equilibrium temperature) that must be provided in order to cause the hydrate to give off moisture to the drying gas. If the lowest-melting hydrate present in the shaft level in question will melt at said equilibrium temperature then arching or bridging can result as mentioned above. This applies in general to any shaft kiln level.

On the basis of known data it is possible to make certain calculations to illustrate the circumstances by plotting curves, making certain practical assumptions, for instance assuming a maximum HCl gas temperature in accordance with the nature and heat resistance of the materials used to build the apparatus, for instance 350°C, and a reasonable limitation to the drying gas flow rate so as to avoid a gas velocity that would fluidize the contents of the shaft kiln and to avoid unacceptably high costs in recovering the HCl gas if the flow rate of the HCl gas used is out of proportion to strict requirements. One would then find that the "passage" between the equilibrium curve and the melt curve would be rather narrow, so that one would expect that only small accidental variations could be tolerated with respect to such process parameters that have a bearing on the temperature. However, it has turned out that an efficient shaft kiln dehydration of agglomerates prepared according to the invention can be carried out without difficulties. Some experiments even indicate that the shaft kiln process is less critical than those skilled in the art would expect, as it has been found possible to use a drying gas of a higher temperature than the maximum temperature found by calculations, without resulting in partial melting of pellets in the shaft kiln. The explanation of these favourable circumstances presumably has something to do with the pellet size as the most favourable circumstances have been found in connection with relatively large pellets. Although pellet sizes of for instance 20 mm and even larger pellets can be used, we prefer pellet sizes between 8 and 12 mm, since this pellet size, everything considered, has been found to be the most favourable, inter alia with respect to the pellet formation, the resistance to abrasion, the pressure drop across the shaft kiln and the rate of diffusion of the water vapour during the dehydration process.

When it is indicated in the present specification that the dehydration of the agglomerate obtained according to the invention is carried out in a one-stage dehydration or that it is carried out in a one-stage air drying step followed by an one-stage HCl drying step, then the meaning thereof is that it is possible and advantageous to effect the dehydration in that way. It will be obvious that it is also possible to dehydrate in a more elaborate way than indicated according to the invention, for instance by employing a two-stage HCl gas dehydration instead of a one-stage dehydration or insert a more or less efficient air drying step prior to a HCl gas dehydration step. Such modifications shall be understood to fall within the scope of the invention.

What is claimed is:

1. A process for preparing substantially anhydrous magnesium chloride from hydrated magnesium chloride, comprising:
   a. feeding heated solid particles of magnesium chloride hydrate having no more than about 3.5 moles of water per mole of magnesium chloride to an agglomerating means;
   b. adding to said heated solid hydrate heated liquid magnesium chloride hydrate having between 3.9 and 5.5 moles of water per mole of magnesium chloride, to form by said agglomerating means, agglomerates of magnesium chloride hydrate having a particle size of 5 – 20 mm. and about 2.0 to 3.5 moles of water per mole of magnesium chloride;
   c. subjecting said agglomerates to dehydration with a drying gas until said agglomerates have between 2.0 and 2.5 moles of water per mole of magnesium chloride and
   d. further dehydrating the agglomerates of step c) in a shaft kiln by flowing upwardly therein HCl gas heated to a temperature sufficient to dehydrate said agglomerates while maintaining the temperature in said kiln below the melting temperature of said agglomerates, said agglomerates sinking in said kiln while being dehydrated, whereby said agglomerates are rendered as substantially anhydrous magnesium chloride.

2. A process according to claim 1 wherein the agglomerates formed in step b) which have a degree of hydration in the range of 2.5 to 3.5 moles of water per mole of magnesium chloride are air dried until they have a degree of hydration of between 2 and 2.5 moles of water per mole of magnesium chloride.

3. A process according to claim 1, wherein the agglomerates are prepared in a size range between 8 and 12 mm.

4. A process according to claim 1, wherein the agglomerates are dehydrated in step c) and step d) by using HCl as the drying gas in each step.

5. A process according to claim 4, wherein said heated liquid magnesium chloride hydrate has between 3.9 and 4.3 moles of water per mole magnesium chloride.

6. A process according to claim 1, wherein said heated solid magnesium chloride hydrate having 2 moles of water per mole magnesium chloride and a temperature of about 150°C and said liquid magnesium chloride hydrate having 4 moles of water per mole of magnesium chloride and a temperature of about 190°C are fed to said agglomerating means to form agglomerates having a temperature of 160°C.

7. A process according to claim 1, wherein said agglomerating means is a pelletization disk.

8. A process according to claim 1, wherein said heated solid particles are prills having a size range of about 0.2 – 1 mm.

9. A process according to claim 1, wherein spray dried magnesium chloride hydrate is used as said solid particles.

* * * * *